United States Patent
Veugen et al.

(10) Patent No.: US 9,397,825 B2
(45) Date of Patent: Jul. 19, 2016

(54) METHOD AND SYSTEM FOR RECONSTRUCTION OF A DATA OBJECT FROM DISTRIBUTED REDUNDANT DATA PARTS

(71) Applicant: Nederlandse Organisatie voor toegepast-natuurwetenschappelijk onderzoek TNO, Delft (NL)

(72) Inventors: Peter Joannes Mathias Veugen, Delft (NL); Hans Maarten Stokking, Delft (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 0 days.

(21) Appl. No.: 14/291,877

(22) Filed: May 30, 2014

(65) Prior Publication Data
US 2014/0359287 A1    Dec. 4, 2014

(30) Foreign Application Priority Data

May 30, 2013    (EP) .................................... 13169929

(51) Int. Cl.
*H04L 9/08* (2006.01)
*H04L 9/00* (2006.01)

(52) U.S. Cl.
CPC ............... *H04L 9/008* (2013.01); *H04L 9/085* (2013.01); *H04L 2209/24* (2013.01)

(58) Field of Classification Search
None
See application file for complete search history.

(56) References Cited

U.S. PATENT DOCUMENTS

| | | | |
|---|---|---|---|
| 4,771,458 A * | 9/1988 | Citta et al. | 380/239 |
| 2007/0156586 A1 * | 7/2007 | Kerschbaum | 705/50 |
| 2011/0264920 A1 * | 10/2011 | Rieffel et al. | 713/189 |
| 2013/0246813 A1 * | 9/2013 | Mori et al. | 713/193 |
| 2013/0339722 A1 * | 12/2013 | Krendelev et al. | 713/150 |

OTHER PUBLICATIONS

European Search Report—EP13169929—Mailing date: Oct. 9, 2013.

(Continued)

*Primary Examiner* — David Le
(74) *Attorney, Agent, or Firm* — Banner & Witcoff, Ltd.

(57) ABSTRACT

A data object is encoded in a redundant code. The redundant code defines a decoding scheme for reconstructing the data object from a sub-set of the encoded data parts. At least the sub-set of the encoded data parts is encrypted using a homomorphic encryption scheme, which allows equivalents of the arithmetic operations of a reconstruction process to be performed on encrypted encoded data parts. The data parts are stored distributed over a plurality of source terminals of a communication network, for use by a target terminal of the communication network. Upon a retrieval command from the target terminal, an upload management module determines which source terminals are available and the upload management module determines causes a selected set of terminals to transmit the encrypted encoded data parts each via its own connection to the network to a decoder server. The decoder server performs homomorphic equivalent operations of arithmetic operations of the reconstruction process and downloads the results to the target terminal. In this way the target terminal does not need to perform the entire reconstruction, without requiring decryption outside the target terminal.

19 Claims, 4 Drawing Sheets

(56) References Cited

OTHER PUBLICATIONS

Hsiao-Ying Lin et al: "A Secure Erasure Code-Based Cloud Storage System with Secure Data Forwarding". IEEE Transactions on Parallel and Distributed Systems. IEEE Service Center. Los Alamitos. CA. US. vol. 23. No. 6. Jun. 1, 2012. pp. 995-1003. XP011445069.

Isaac Agudo et al: "Cryptography Goes to the Cloud". Secure and Trust Computing. Data Management. and Applications; Proceedings of the STA 2011 Workshops: IWCS 2011 and STAVE 2011. Loutraki. Greece. Jun. 28-30, 2011. Jun. 30, 2011. pp. 190-197. XP55081946.

Yi Ren et al: "A distributed data storage and retrieval scheme in unattended WSNs using Homomorphic Encryption and secret sharing". Wireless Days (WD). 2009 2nd IFIP. IEEE. Piscataway. NJ. USA. Dec. 15, 2009. pp. 1-6. XP031659467.

Frederique Oggier et al: "Self-repairing homomorphic codes for distributed storage systems". A INFOCOM. 2011 Proceedings IEEE. IEEE. Apr. 10, 2011. pp. 1215-1223. XP031953290.

Ari Juels et al: "New approaches to security and availability for cloud data"• Communications of the ACM, vol. 56. No. 2. Feb. 1, 2013. p. 64. XP55081941.

* cited by examiner

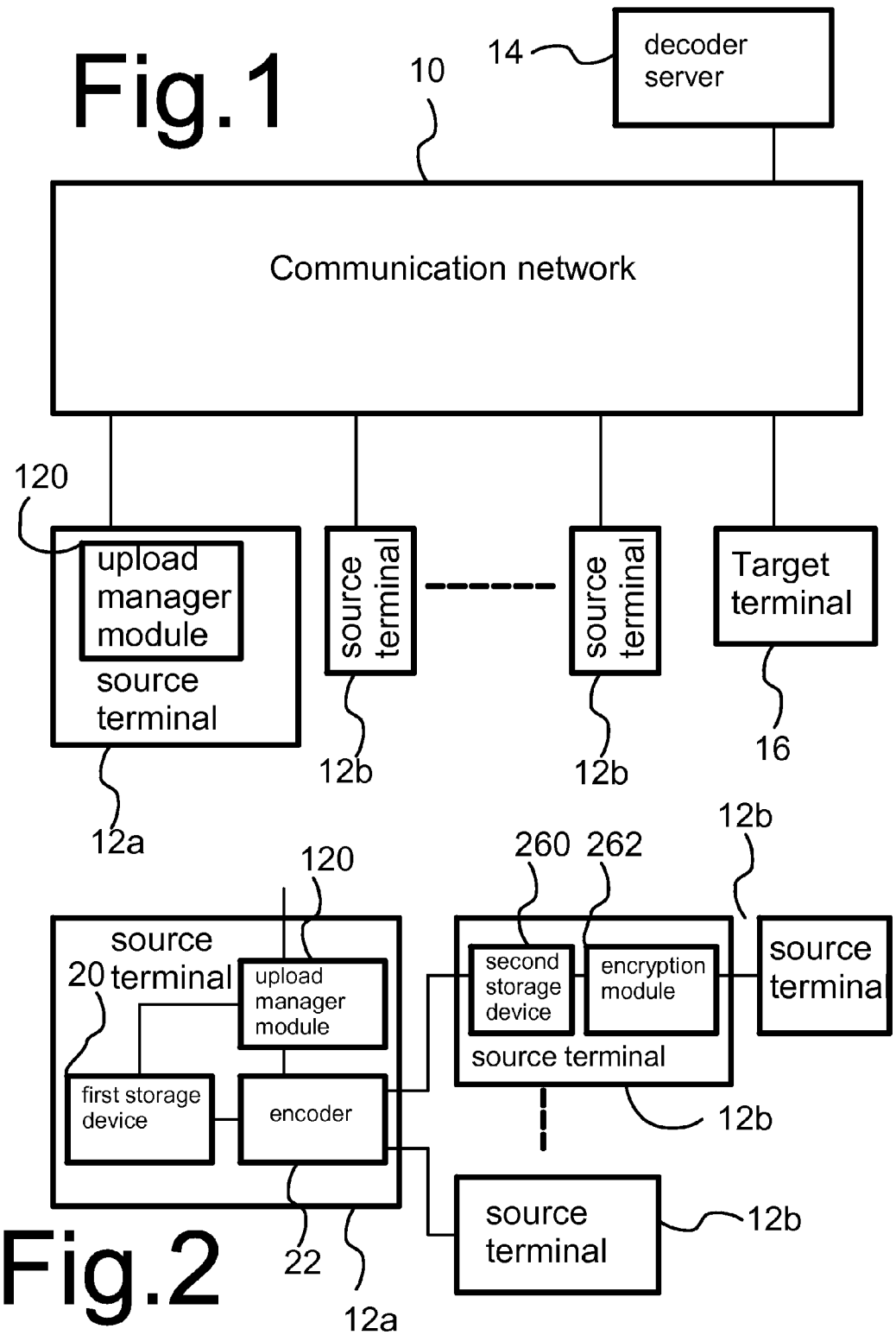

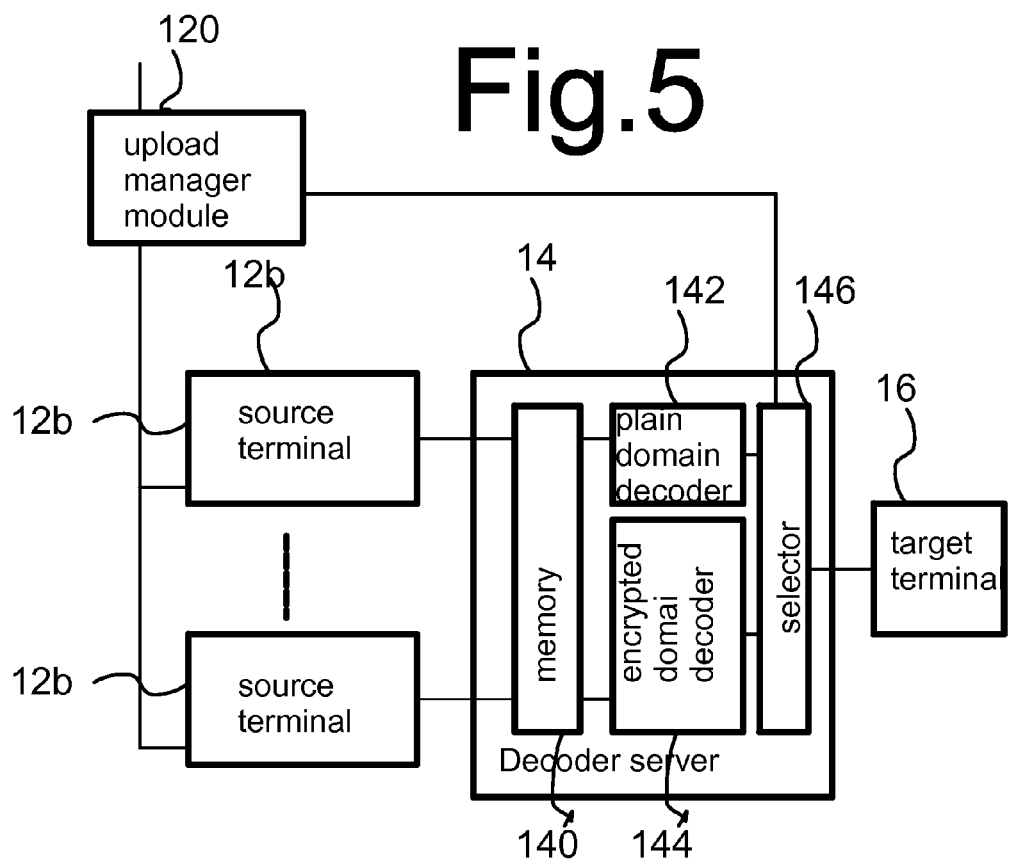
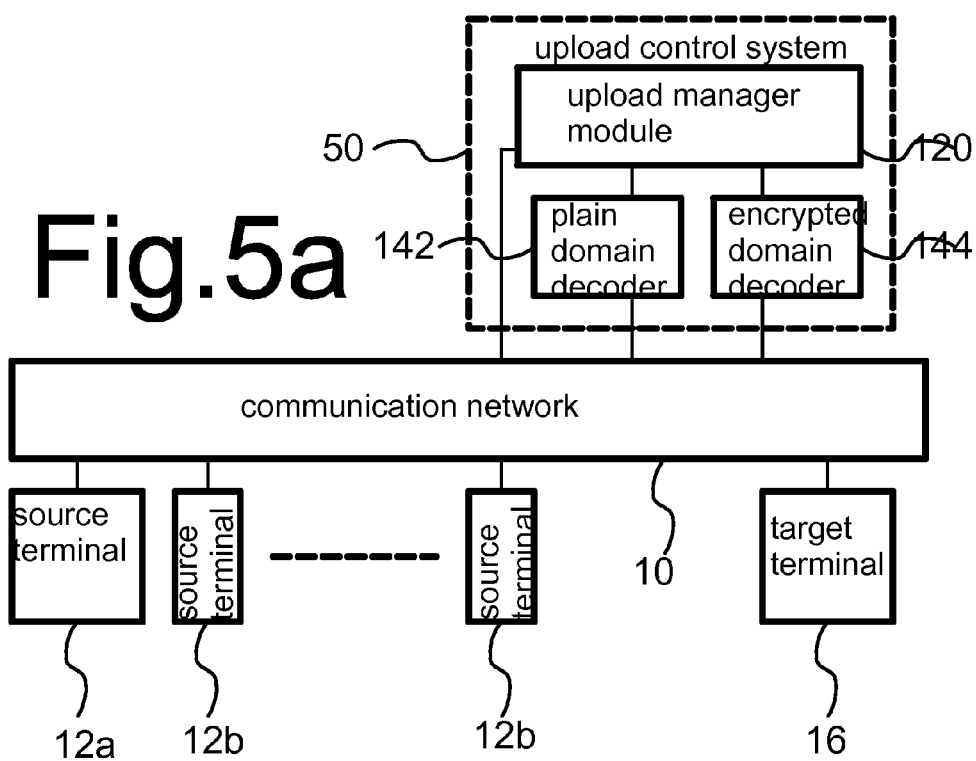

METHOD AND SYSTEM FOR RECONSTRUCTION OF A DATA OBJECT FROM DISTRIBUTED REDUNDANT DATA PARTS

CROSS-REFERENCE TO RELATED APPLICATIONS

This application claims priority under 35 U.S.C. §119 to European patent application EP 13169929.0, filed May 30, 2013, the contents of which are hereby incorporated by reference in its entirety.

FILED OF THE INVENTION

The invention relates to a method of information storage and transmission and a system that makes use of that method.

BACKGROUND

Upload and download bandwidth differ in many information distribution systems. When a user wants to use a mobile device to retrieve a video stream from his or her home or residential network via a public network, or more generally to transport data to a target terminal from a source terminal of a network, this may have the effect that the retrieval is bottlenecked in the network at the side of the source terminal, even though the target terminal, such as the mobile device, has more severe computational limitations than devices in the home or residential network.

This bottleneck is lessened when use is made of distributed uploading from a plurality of source terminals, each of which having its own connection to the network. For this purpose, a user may store respective data parts from a data object at different source terminals in advance of the desired transport. When transport of the data object to the target terminal is requested, commands can be sent to the source terminals that store the different data parts to make each source terminal transmit its data part to the target terminal via the network via its own connection. To keep the source terminals from obtaining access to the data object, it may be desirable to encrypt the data parts for this purpose. But if the user of the target terminal supplies the data parts only to trusted source terminals, e.g. source terminals of friends that may share access to the data object, this may not be needed.

However, this makes the retrieval dependent on the joint availability of all of the source terminals. Additional measures are needed when this cannot be guaranteed. When it is known in advance that a particular source terminal will not be available, a replacement terminal may be designated that may be used instead and a copy of the data part from the particular source terminal may be stored at its replacement terminal. This may make it necessary to use encryption when the data part is copied to an untrusted replacement terminal. Source terminals of friends may be obligated to apply encryption when the data part is copied to an untrusted source terminal for this purpose.

The requirement of joint availability can also be relaxed by avoiding the need for a predetermined fixed set of source terminals. This can be addressed by redundancy techniques known from RAID systems (Redundant Array of Independent Disks). In its simplest form this involves storing copies of the same data part at different terminals and attempting to retrieve the data parts from all terminals. But a more efficient solution is to store the data parts by means of a redundant code. For example, conventional error correcting codes use a set of code words that each are built from a number of symbols, in such a way that the codeword can be inferred even if a number of the symbols from the codeword is missing. In a systematic code, this is done by constructing the codeword from information symbols that must be encoded with added symbols that are computed from the information symbols.

For distributed uploading the data parts of the data object may be treated as information symbols from which the symbols of a codeword are constructed and the symbols from the codeword may be stored at different source terminals. This enables the target terminal to reconstruct the information symbols even if a number of source terminals fails to provide information.

Unfortunately, reconstruction from incomplete code words from a redundant code is a computationally intensive task when a storage-efficient code with large code words is used. This task may be beyond the capacity of simple target terminals such as mobile devices. Therefore, it is desirable to perform this task at a network node upstream from the target terminal, but downstream from the source terminals.

Use of designated replacement terminals and use of a redundant code may be combined to make data transport even more robust. However, this creates a problem when encryption is used to keep untrusted source terminals from access to their data part. In this case, and when uploading from the target terminal is avoided, a need to perform decryption before decoding according to the redundant code would force the target terminal to perform both decryption and decoding.

SUMMARY

Among others, it is an object to provide for secure transport of a data object to a target terminal via a network, using data parts of the data object from a plurality of source terminals wherein the computational load on the target terminal can be reduced. A method of transporting a data object to a target terminal via a network according to claim 1 is provided, for use in a network wherein a data object is transported to a target terminal via a network, using encoded data parts from a plurality of source terminals, wherein encoded data parts derived by encoding the data object in a redundant code are used, the redundant code defining a decoding scheme for reconstructing the data object from a sub-set of the encoded data parts, and wherein at least the sub-set of the encoded data parts has been encrypted using a homomorphic encryption scheme. Encoded data parts are used that have been derived by encoding the data object in a redundant code, such as a code used for RAID systems. The redundant code defines a decoding scheme for reconstructing the data object from a sub-set of the encoded data parts. At least the sub-set of the encoded data parts has been encrypted using a homomorphic encryption scheme.

The method comprises
- collecting the sub-set of the encrypted encoded data parts from the source terminals at a decoder server in the network,
- applying homomorphic equivalents of arithmetic operations of the decoding scheme to the encrypted encoded data parts at the decoder server,
- transmitting results of applying the homomorphic equivalents of the arithmetic operations to the target terminal for decryption of the data parts from the results at the target terminal.

A homomorphic equivalent operation of an arithmetic operation is another arithmetic operation that produces a resulting number, which corresponds to an encrypted version of the result of applying the arithmetic operation to a pair of numbers, from encrypted versions of the individual numbers of the pair.

In the claimed method, arithmetic operations of the decoding scheme are effectively applied in the encrypted domain, i.e. to encrypted rather than plain data in the sub-set that has been encrypted, although the decryption has been performed after encoding, i.e. so that the encoding was applied to plain data. By applying homomorphic equivalents of the arithmetic operations the operations are effected in the encrypted domain. In this way it is possible to remove processing load for reconstruction from the target terminal to the decoder server at a different location in the network without requiring decryption outside the target terminal.

As is known per se, redundant encoding may make use of a code word that is made up of a plurality of symbols that are used as numbers in arithmetic operations like additions or multiplications in the computation of reconstructed symbols. Data parts of a data object may be coded using a single such code word, or as a stream of code words for successive encoded groups of data parts respectively. In a systematic code for example, part of the symbols in a code word are original data parts of a data object and part of the symbols are additional symbols computed from the symbols that are the original data parts. When one or more of the symbols that are original parts are missing, the additional symbols can be used to compute the missing symbols. Such a computation may come down to a matrix multiplication, that is, computing a sum of products of the symbols with coefficients defined by the coding scheme for reconstructing a missing symbol from a set of available symbols. When the coefficients are integers, the products too can be computed by summing. Each symbol may correspond to a respective group of bits, the symbols that are the original data parts containing groups of bits from the original data objects. Similarly, encryption and decryption may be applied to groups of bit treated as numbers. Preferably, the homomorphic encryption is applied to symbols of the redundant code on an individual basis, so that each symbol is encrypted by a respective encryption. Preferably, the bit group sizes used in the homomorphic encryption and in the symbols of the redundant code are selected to be the same, e.g. 1024 bits long or 2048 bits long. Alternatively, each symbol of the redundant code may be padded with zeros to form a bit groups for encryption, but this reduces efficiency.

Preferably a redundant code is used that provides for computation of reconstructed symbols by computing a sum of products of the symbols with integer coefficients, or a product of exponents of the symbols by integer coefficients. In this case, it suffices to use a homomorphic encryption scheme that provides for a homomorphic equivalent of a sum or multiplication operation.

If a redundant code is wherein the coefficients are rational numbers, all coefficients may be multiplied by a common factor to produce integer versions. In this case, the integer versions may be used in the application of homomorphic equivalents of arithmetic operations of the decoding scheme. In this case it may be needed to divide out the common factor from the resulting symbols after decryption. However, it has been found that this can also be done during decryption. Either may be performed at the target terminal. In an embodiment information indicating the value of the common factor is transmitted to said target terminal. Thus use of a combination of encryption and redundant codes with rational coefficients is made possible. The common factor may depend on the sub-set of encrypted symbols that is used in decoding.

In an embodiment a set of "trusted" source terminals may be used that stores plain data parts and "untrusted" source terminals that store encrypted data parts. In this case, an automatic selection may be made between using normal reconstruction applied to plain encoded data parts or using reconstruction with homomorphic equivalents applied to encrypted encoded data parts. The latter may be used if it is determined that a sufficient number of plain encoded data parts. Thus a secure automatic use of data parts from untrusted backup terminals is made possible if some trusted source terminals are not available.

In a further embodiment a mix of data parts from trusted source terminals and untrusted source may be used, the trusted source terminals being switched to provide encrypted data parts for this when a sufficient number of trusted source terminals is not available for reconstruction. The data parts from the trusted source terminals may be encrypted real time, i.e. after it has been determined that insufficient trusted source terminals are available, or pre-stored encrypted data parts may be used, which have been encrypted prior to the determination.

In an embodiment an upload manager module for controlling transport of a data object to a target terminal is provided that is designed to make a selection of the source terminals that will be used to provide a sub-set of encoded data parts for reconstruction and that causes the decoder server to apply homomorphic equivalents of arithmetic operations of the decoding scheme. In an embodiment specific coefficient used for this depend on the selected sub-set. In this case the upload manager module may provide the decoder server with an indication of the coefficients that must be used. The target terminal may send a retrieval command to the upload manager module to start the process. In an embodiment the upload manager module may be part of a source terminal. In other embodiments the upload manager module may be part of a decoder server or it may be a separate server communicating with the source terminals and the decoder server via the network.

In an embodiment a decoder server for reconstructing data parts of a data object is provided that makes use of homomorphic equivalent operations of the arithmetic operations of a redundant code.

In an embodiment a computer program product is provided that comprises instructions for a programmable processing system that, when executed by the processing system, will cause the processing system to execute the method. The computer program product may be a magnetic or optical disk or a (non-volatile) semi-conductor memory example, storing the instructions in machine executable form.

BRIEF DESCRIPTION OF THE DRAWINGS

These and other objects and advantageous aspects will become apparent from a description of exemplary embodiments with reference to the following figures.

FIG. 1 shows an information transport system
FIG. 2 shows an encoding system
FIG. 5, 5a show decoding systems

DETAILED DESCRIPTION OF EXEMPLARY EMBODIMENTS

Figure 3:
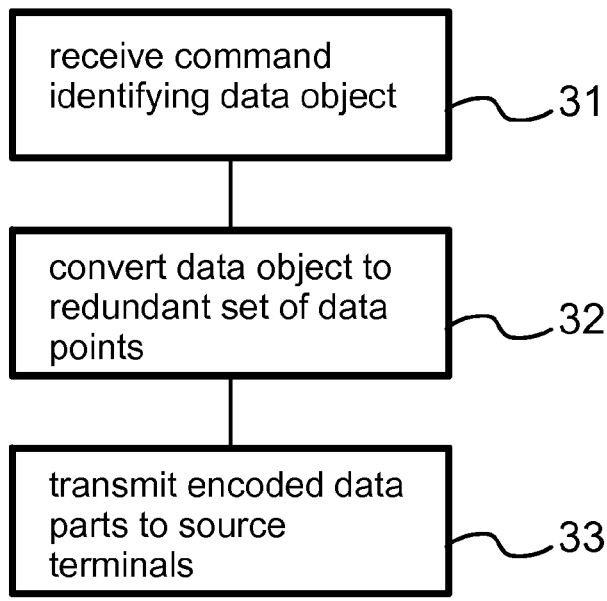
FIG. 3 shows a flow-chart of encoding

FIG. 1 shows an information transport system comprising a plurality of source terminals 12a,b, a decoder server 14 and a target terminal 16 coupled by a communication network 10. Although the coupling to communication network 10 is shown by lines that may correspond to wired connections, such as ADSL lines, it should be understood that part or all of the lines may represent wireless connections. For example, target terminal 16 may be a mobile device, such as a mobile telephone, which communicates with network 10 by means of wireless communication. Furthermore, although communication network 10 is shown as a single box, it should be appreciated that communication network 10 may comprise sub-networks such as the Internet and a mobile telephone network.

As used herein, source terminals 12a, b may be discrete devices, such as a personal computer or a gateway device of a local network, or a source terminal 12a,b may be a local network that contains different devices that perform functions of the source terminal. Source terminals 12a,b each comprise a memory device and a network interface (not shown). A first source terminal is shown to comprise an upload manager module 120. Source terminals 12a,b may in fact be local network systems, comprising one or more devices with a storage device, a router and an in-home or residential WIFI network or wired network for example (not shown). In this case the router may perform the function of network interface. Upload manager module 120 may be implemented using a computer program running on a processor in source terminal 12a.

In an example, a first source terminal 12a that contains upload manager module 120 and a mobile device that forms target terminal 16 may be owned by the same person, the mobile device using upload manager module 120 to marshal the assistance of other source terminals 12b to obtain a data object that was previously provided on the first source terminal 12a.

In operation the information transport system of FIG. 1 executes a first process to store a data object distributed over source terminals 12a,b and a second process to retrieve the information at target terminal 16, using data transport from source terminals 12a,b.

FIG. 2 shows the devices involved with this first process as part of an encoding system. This encoding system corresponds to a partial view of the information transport system of FIG. 1, with elements from that information transport system. The encoding system comprises source terminals 12a,b. A first source terminal 12a comprises a first storage device 20, upload manager module 120 and an encoder 22. A plurality of second source terminals 12b (only two shown, but more may be used), each comprise a second storage device 20 (shown only in one of the second source terminals 12b), and optionally an encryption module 262.

In first source terminal 12a first storage device 20 has an output coupled to encoder 22, which has outputs coupled to a plurality of second storage devices. Communication network 10 (not shown) may be used to provide this coupling, but alternatively wired or wireless connections outside communication network 10 may be used (optionally temporary connections). Upload manager module 120 has an input for receiving commands and control outputs coupled to first storage device 20 and encoder 22. Upload manager module 120 and encoder 22 may be implemented using a programmable processor system and computer programs for making programmable processor system perform their function.

In a plurality of second source terminals 12b the second storage device 260 is arranged to receive and store encoded data from the encoder 22 of the first source terminal 12a. At least part of this plurality of second source terminals 12b may comprise an encryption module 262 with an input coupled to the second storage device 260 and an output coupled to a further one of the second source terminals 12b, for providing an encrypted version of the data part from its second storage device 260 to that of the further one of the second source terminals 12b.

The second source terminals 12b that receive encoded data parts without encryption may be defined as "friend" terminals or "trusted" terminals of the first source terminal 12, whereas further ones of the second source terminals 12b that receive only encrypted versions of encoded data parts are defined as "non-friend" terminals or "untrusted" terminals.

FIG. 3 shows a flow-chart of the distributed information storage process. The distributed information storage process is triggered by a command to upload manager module 120, the command identifying a data object that must be stored in a distributed way. In an embodiment, the data object may be a file with video data, representing a video stream, or a file with audio data, stored in first storage device 20. In other embodiments the data object may be a combination of files, e.g. representing a plurality of streams stored in first storage device 20.

In a first step 31 upload manager module 120 receives the command identifying the data object. In a second step 32 upload manager module 120 causes encoder 22 to convert the data object into a redundant set of data parts. An exemplary process of doing so comprises splitting the data object into K parts, where K is an integer greater than one. Each data part may comprise a group of bits, with the same number of bits in each group. The different data parts will be distinguished an index i may be used with i=1, . . . K.

Subsequently, the different data parts i may be used to form symbols of an N symbol code word of a redundant code, with N>K. A redundant code known for use in a RAID system may be used for example. Error correcting codes are one example of redundant codes. An error correcting code allows reconstruction of all symbols from a code word with no more than a predetermined number of errors.

More generally, an (N,K) redundant code is any code with N-symbol code words that allow reconstruction of the entire codeword if at least K symbols from the codeword are known. A wide variety of such redundant codes are known per se from coding theory. An redundant code may be used wherein the N symbols Y(j) (with j=1 . . . N) of the codeword are a sum of products of symbols X(i) corresponding to the bit group of the data part i:

$$Y(j)=\text{Sum } M(i,j)*X(i)$$

Herein X(i) are the data parts and the sum is taken over the data part index i. M(i,j) are coefficients of a matrix defined for the redundant code. The sum and product may be computed according to the arithmetic operations of a Galois field for example. Alternatively, multiplicative encoding may be used wherein the product and sum are replaced by a power and a product respectively.

$$Y(j)=\text{Product } X(i)^{M(i,j)}$$

The same matrix may be used, because products correspond to sums in exponent. In a redundant code, the matrix has the property that decoding operations exists for any subset of K of the N symbols Y(j)

$$X(i)=\text{Sum } A(i,j)*Y(j)$$

wherein the sum is taken over the index j of symbols Y(j) in the subset. A(i,j) are coefficients of a decoding matrix which acts as the inverse of the matrix M(i,j). A code is used wherein the coefficients of the matrix A(i,j) are integer numbers, or can be made integer numbers c*A(i,j) by multiplication with a common constant factor c, so that the products A(i,j)*Y(j) can be computed up to a common factor by adding Y(j) A(i,j)

times to itself. Different common factors c may be used for different subsets of K of the N symbols Y(j) from which the symbols X(i) are determined, as needed to make all c*A(i,j) for that subset integers. Alternatively, a smallest common multiple of the smallest possible factors for different sub-sets may be used.

In the multiplicative encoding version $$X(i) = \text{Product } Y(j)^{A(i,j)}$$

and because the coefficients A(i,j), or c*A(i,j) are integers, the exponents can be computed up to a common exponent by taking products.

Preferably a matrix M(i,j) is used that has the property that any K rows are linearly independent of each other, i.e. that no linear combination of K rows sums to zero. A row is a set of K coefficients {M(i,1), M(i,2), ...} for a given value of i. This guarantees that coefficients A(i,j) exists from which any X(i) can be computed from any sub-set of K encoded symbols Y(j). Of course, the coefficients A(i,j) depend on the sub-set that is used. A systematic code may be used, wherein Y(j)=X(j) for j smaller than or equal to K. In one example of a systematic code a Vandermonde matrix may be used to compute the N−K remaining symbols for j=K+1, ... N where M(i,j) is the (j−k−1) exponent $i^{j-k-1}$ of i when j is greater than K.

Although an example will be described that uses a redundant code wherein K symbols Y(i) always suffice to reconstruct any X(j), it should be appreciated that alternatively a code may be used wherein more than K symbols Y(i) may be needed to reconstruct a set of symbols X(j). In this case more than K source terminals may be required to supply encoded data parts for reconstruction.

Symbols Y(j) from the computed codeword may be used as a encoded data parts for respective indices j. Thus, there will be N encoded data parts. If a systematic code is used, the first K of these N encoded data parts correspond to the bit groups taken from the original data object and the final N−K represent additional encoded data parts that can be used to reconstruct the original data object if a number of the original data parts is not available.

As will be discussed later, the size of the symbol, i.e. the number of bits in the bit group that forms the symbol, preferably corresponds to symbol size of an encryption scheme. M bit symbols with M=1024 or 2048 may be used for example.

In an example wherein the data object comprises a stream of binary data, the stream may be divided into successive bit groups in which case data part i may comprise bit groups at bit positions m in the stream, with m=M*(i+r*K), wherein M is the number of bits in a bit group and r is an index for positions in the stream that runs through integers starting from 0. In this case, a group for a data part i and an index r may be used as an M bit symbol X(i, r). For every index value r a code word comprising M bit symbols Y(j, r) (j=1 ... N) may be computed according to the redundant code. For each symbol position j in the code words a sub-stream S(j) of successive symbols {Y(j, 0), Y(j, 1), Y(j, 2) ...} with successive values of r may be computed that forms the jth encoded data part. If a systematic code is used, the first K of these N encoded sub-streams S(j) correspond to the bit groups taken from the original data stream and the final N−K sub-stream represent additional encoded data streams that can be used to reconstruct the original data stream if a number of the original sub-streams is not available.

In a third step 33 upload manager module 120 uses a list of addresses of trusted source terminals 12b to cause each of at least N−1 of the encoded data parts to be transmitted to a respective one of the trusted source terminals 12b, for storage at that source terminal 12b. Optionally upload manager module 120 may also cause copies of the same encoded data part to be transmitted to a plurality of source terminals 12b and/or also to cause a plurality of different encoded data parts to be transmitted to a same source terminal 12b.

Optionally upload manager module 120 also provides for transmission of information identifying the data object, and/or identifying upload manager module 120 itself as the managing entity for the data part. The trusted source terminals 12b may be terminals of friends of the user of the source terminal with upload manager module 120 for example. Upload manager module 120 may register identifications of the trusted source terminals 12b to which data parts were transmitted in relation to an identification of the data object. This may be used to identify the source terminals with stored data parts if a selection from the list of trusted source terminals 12b was used. Optionally, upload manager module 120 may also provide trusted source terminals 12b on the list with an identification of the data object combined with identifications of the trusted source terminals 12b to which data parts were transmitted. This may be used enable the friends of the user to access the data object.

Figure 4:
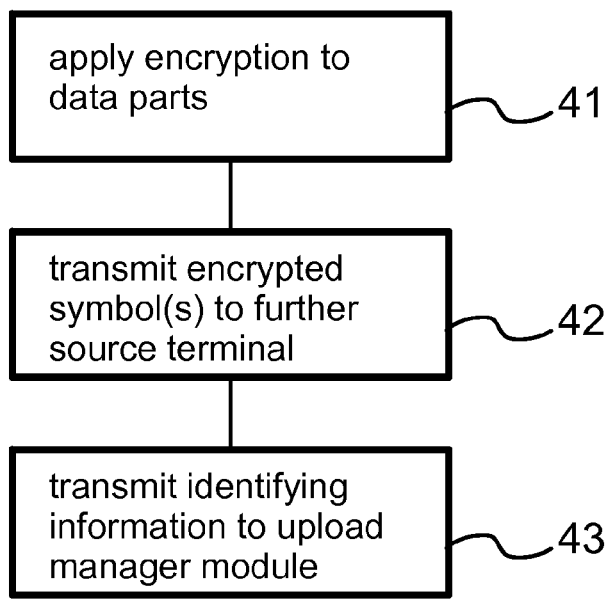
FIG. 4 shows a flow chart of forwarding

FIG. 4 shows a flow-chart of an information backup process that may be used by a trusted source terminal 12b to store copies of the data part.

In a first step 41, the trusted source terminal 12b applies encryption to its data part. Herein the encryption is applied to an encoded symbol Y(j) of the redundant code that has been stored at the trusted source terminal 12b, to produce an encrypted value E(Y(j)). If the data part is stored as a sub-stream of symbols Y(j) for successive values of r, encryption is applied to each of the symbols in the sub-stream individually. Preferably a public-private key encryption scheme is used, from which the public key is used to encrypt the symbol or symbols Y(j).

A homomorphic encryption scheme is used, i.e. a scheme that provides for an operation applicable to any pair of encrypted symbols that results in a symbol that corresponds to the encrypted version of a sum of the pair of unencrypted symbols, or to the encrypted version of a product of the pair of unencrypted symbols. In more detail, a homomorphic encryption scheme is characterized in that there exists a dyadic operation F (an operation with two operands) on encrypted symbols values, with the property E(Y1+Y2)=F(E(Y1)), E(Y2)), wherein Y1 and Y2 are any symbol values, and E(Y1), E(Y2) and E(Y1+Y2) their encrypted versions and the encrypted version of their sum. As used herein, the dyadic operation F is referred to as the homomorphic equivalent of addition. In another embodiment a homomorphic encryption scheme may be used wherein the dyadic operation F is the homomorphic equivalent of multiplication, i.e. F(E(Y1),E(Y2))=E(Y1*Y2).

Homomorphic encryption schemes are known per se. As an example the Paillier scheme may be used, wherein $$E(y) = g^y * r^N \bmod N^2$$

wherein g is a generator number, r a random value that is freshly chosen for each encryption operation and N is an RSA-like number. In the Paillier scheme $$E(y1)*E(y2) = E(y1+y2)$$

In this case the multiplication operation is the homomorphic equivalent of addition. As another example, RSA encryption may be used, wherein $$E(y) = y^e \bmod N$$

This encryption scheme has the homomorphic property that $$E(y1)*E(y2)=E(y1*y2)$$

In a second step 42, the trusted source terminal 12b transmits the encrypted symbol or symbols to a further source terminal 12b for storage at that source terminal. In an optional third step 43, the trusted source terminal 12b transmits information identifying the data object and the further source terminal 12b to upload manager module 120 that caused the data object to be sent, for recording by upload manager module 120.

Optionally, first source terminal 12a also comprises an encryption module, upload manager module 120 causing the encryption module to transmit encrypted version of the data parts as well when the data parts are transmitted, for example to the same second source terminal 12b to which the data part is sent without encryption. In another optional embodiment, second source terminals 12b may be configured to encrypt the data part and store both encrypted and unencrypted versions of the data part in advance of any demand to transmit the encrypted version.

In an embodiment wherein a systematic code is used, upload manager module 120 causes the first K symbols to be stored in unencrypted form at trusted source terminals 12a,b (i.e. the original bit groups from the data objects) and to transmit the remaining N−K symbols of the codeword in encrypted form to untrusted source terminals 12a,b. Optionally the first K symbols may also be stored in encrypted form at untrusted source terminals 12a,b. Thus, decoding an decryption will be needed only if trusted source terminals 12a,b that store the first K symbols of the code word are not available.

In operation the information transport system of FIG. 1 executes a second process to play the information at target terminal 16, using data transport from source terminals 12a,b. The process is triggered by a play command, for example from target terminal 16 to upload manager module 120.

FIG. 5 shows the devices involved with this second process as part of a decoding system. This decoding system corresponds to a partial view of the information transport system of FIG. 1, with elements from that information transport system. The decoding system comprises upload manager module 120 and optionally other components of first source terminal 12a, second source terminals 12b (only two shown, but more may be used), decoder server 14 and target terminal 16. Upload manager module 120 has control outputs coupled to second source terminals 12b and decoder server 14 via the communication network. The coupling from upload manager module 120 to second source terminals 12b may be provided via the communication network (10 in FIG. 1 but not explicitly shown in FIG. 5) or outside the communication network. The coupling from upload manager module 120 to decoder server 14 may be provided via the communication network. Second source terminals 12b and optionally first source terminal 12a are coupled to decoder server 14 via the communication network (not shown).

Decoder server 14 comprises a memory 140, a plain domain decoder 142, an encrypted domain decoder 144 and a selector 146. Memory 140 has an input interface to receive a plurality of data parts from different source terminals 12b. Plain domain decoder 142, and encrypted domain decoder 144 have inputs to read the data parts from memory 140 and outputs to selector 146. Selector 146 has an output coupled to target terminal 16.

Plain domain decoder 142 is configured to perform reconstruction of all parts X of the data object. In an embodiment wherein additive coding is used, this involves computations according to $$X(i)=\text{Sum } A(i,j)*Y(j)$$

In the embodiment wherein multiplicative encoding is used this involves computations according to $$X(j)=\text{Product } Y(i)^{A(i,j)}$$

As noted, in the additive embodiment, the multiplications may be performed by means of repeated addition and in the multiplicative embodiment the exponentiation may be performed using repeated multiplication. Encrypted domain decoder is configured to perform a decoding operation that is a homomorphically equivalent to the operation performed by the plain domain decoder 142, but applied to encrypted versions E(Y(j)) of the symbols Y(j), using the homomorphical equivalents of the additions or multiplications of the first or second embodiment respectively.

Upload manager module 120 controls whether plain domain decoding or encrypted domain decoding is used. A control output of upload manager module 120 is shown coupled to selector 146 (effectively through the communication network), but control outputs of upload manager module 120 may also be coupled to plain domain decoder 142 and encrypted domain decoder 144. Plain domain decoder 142, encrypted domain decoder 144 and selector 146 may be implemented using a processor system programmed with a computer program to make the processor system perform their functions. The coupling to upload manager module 120, source terminals 12b and target terminal 16 symbolize coupling through the communication network, using network data transport to transmit information.

Selector 146 may be a switch that switches between states wherein results from plain domain decoder 142 and encrypted domain decoder 144 are forwarded to target terminal 16. However, it should be appreciated that different types of selector may be used, such as a selector that sends an enable signal to a selected one of plain domain decoder 142 and encrypted domain decoder 144, or a selector that selects between execution of a program module for plain domain decoding and a program module for encrypted domain decoding, the plain domain decoder 142 and encrypted domain decoder 144 being formed by these program modules and a programmable processor system.

Figure 6:
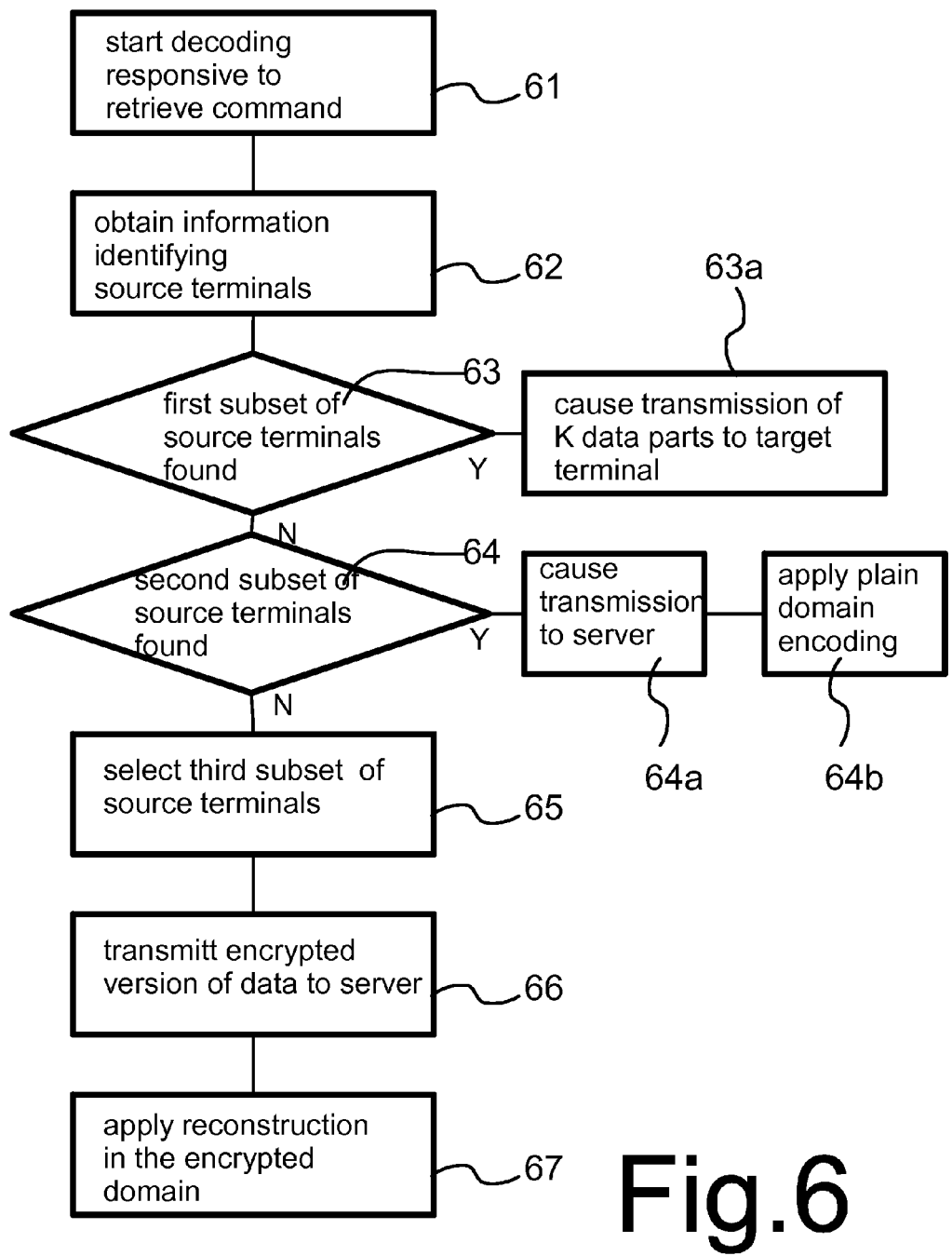
FIG. 6 shows a flow-chart of decoding

FIG. 6 shows a flow chart of decoding. Decoding is started in response to a retrieve command from target terminal 16 to upload manager module 120. The retrieve command identifies a data object that must be sent to target terminal 16. In a first step 61, upload manager module 120 receives this command. In a second step 62, upload manager module 120 obtains information that identifies source terminals 12a,b that store data parts of the data object. In an embodiment upload manager module 120 maintains a list of such source terminals 12a,b, the list being generated when upload manager module 120 causes the data parts to be stored at different source terminals 12a,b, and updated when source terminals 12b report copying of the data parts to other source terminals 12b. In this embodiment upload manager module 120 may obtain the information from that list. In another embodiment, upload manager module 120 may use a discovery process, by polling source terminals 12b to find out which data parts are stored in which source terminals 12b. In an embodiment source terminals 12a,b may transmit information indicating whether the data parts are plain or encrypted along with the data parts to the decoder server, the upload manager module 120 obtaining this information. In this embodiment upload manager module 120 may send commands to start transmitting data parts to a predetermined set of source terminals before obtaining the information.

In an optional third step 63, upload manager module 120 tests whether a first sub-set of source terminals 12a,b can be found that stores K unencrypted original data parts (e.g. the first K symbols of a codeword of a systematic code). If so, upload manager module 120 proceeds to a first sub-step 63a, wherein it causes the source terminals 12a,b to transmit the K data parts form the first sub-set to target terminal 16 via communication network 10. Target terminal 16 may use these data parts directly to obtain the data object.

If the condition of third step 63 is not met, upload manager module 120 executes a fourth step 64, to test whether a second sub-set of source terminals 12a,b can be found that stores K unencrypted data parts (any sub-set of K data parts from the N data parts obtained by encoding). If so, upload manager module 120 proceeds to a second sub-step 64a, wherein it causes these source terminals 12a,b to transmit the K data parts from the second sub-set to decoder server 14. In the embodiment data parts from a predetermined set of source terminals are transmitted with information indicating whether the data parts are plain or encrypted, upload manager module 120 may indicate to the decoder server 14 which of those data parts should be used. In a third sub-step 64b upload manager module 120 transmits a command to decoder server 14 to apply plain domain encoding to these K data parts to obtain the original data parts of the data object and transmit these reconstructed data parts to target terminal 16. The command to decoder server 14 may comprise information indicating the matrix coefficients A(i,j) to be used in the decoding. The combination of K data parts that is used is determinative for the matrix coefficients A(i,j) to be used in the decoding. Target terminal 16 may use these data parts directly to obtain the data object.

If the condition of fourth step 64 is not met, upload manager module 120 executes a fifth step 65, to select a third sub-set of source terminals 12a,b that stores K different data parts whether encrypted or not (any sub-set of K data parts from the N data parts obtained by encoding). The sub-set of K data parts is determinative for the matrix coefficients A(i,j) to be used in the decoding.

In a sixth step 66 upload manager module 120 sends commands to the source terminals 12a,b that store the data parts of the third sub-set, to transmit encrypted versions of the K data parts to decoder server 14. If any of these source terminals 12a,b only has a stored unencrypted version of a data part, it may encrypt this data part before transmission, using the homomorphic encryption scheme as described in the preceding. In the embodiment data parts from a predetermined set of source terminals are transmitted with information indicating whether the data parts are plain or encrypted, upload manager module 120 may indicate to the decoder server 14 which of those data parts should be used, and cause an encryption module (not shown) to encrypt the used data parts for which the information indicates that they are plain.

In a seventh step 67 upload manager module 120 sends a command to the decoder server 14 to apply reconstruction in the encrypted domain, that is, to apply the homomorphic equivalent of the reconstruction to the encrypted data parts received from the source terminals 12a,b. The command to decoder server 14 may comprise information indicating the matrix coefficients A(i,j) to be used in the decoding. Furthermore, this command commands to the decoder server 14 to transmit the resulting data parts to target terminal 16. Target terminal 16 first decrypts these data parts before using them to obtain the data object. If public-private key pair encoding is used, target terminal 16 may use the private key for this.

In an embodiment encrypted domain decoder 144 uses integers $c*A(i,j)$ corresponding to a constant factor c times the matrix coefficients A(i,j) in the decoding process:

$$X(i)=\text{Sum}(c*A(i,j))*Y(j) \text{ or } X(j)=\text{Product } Y(i)^{(c*A(i,j))}$$

In this embodiment of seventh step 67 the command from the upload manager module 120 may comprise information indicating the product $c*A(i,j)$ of the matrix coefficients A(i,j) and the factor to be used in the decoding.

In this embodiment, decryption in target terminal 16 may compensate for the effect of the factor c. For example, an embodiment may make use of a decryption function $$D(z)=z^d \bmod N$$

In this embodiment, target terminal 16 may perform decryption according to $$D'(z)=z^{d1} \bmod N$$

wherein $d1=d*c^{-1} \bmod \text{phi}(N)$, (phi(N) being Euler's phi function, which is known from number theory). For this purpose, upload manager module 120 may transmit information to target terminal 16, identifying the constant factor $c^{-1}$ to determine d1 from the private key d for use in decryption. The value of c or $c^{-1}$ may be transmitted for example.

In an embodiment wherein target terminal 16 is prevented from obtaining information about the sub-set of data parts Y(j) from which the data object is reconstructed a factor value c is used that is a common multiple of the smallest possible factors c for the individual subsets.

The first, second and third subsets may comprise a data part stored at the first source terminal 12a from which data parts were supplied to the second source terminals 12b.

The first, second and third subsets are preferably selected to that each of its K data parts is stored at a respective different source terminal 12a,b. This minimizes upload bandwidth. But if no such subset can be found, a sub-set may be selected wherein a plurality of the K data parts is stored at a same source terminal 12a,b, e.g. at first source terminal 12a. This may slow down uploading because of increased demand on bandwidth. Therefore, in an embodiment the conditions of the third step 63 and/or fourth step 64 may be tightened by also requiring that no source terminal 12a,b is used to provide more than a predetermined number (e.g. one, or two) of the data parts in the sub-set. In an embodiment, the predetermined number used in the third step 63 may be lower than that in the fourth step 64, since the steps followed when the condition of third step 63 is met are less demanding than those of fourth step 64.

Although an embodiment has been described wherein upload manager module 120, plain domain decoder 142 and encrypted domain decoder 144 are located at specific nodes of the network, it should be appreciated that they may be located differently. For example, upload manager module 120 may be located outside the first source terminal at which the data object is initially provided. Upload manager module 120 may be provided in an upload server for example, that communicates with source terminals 12a,b via the communication network. FIG. 5a shows an example wherein an upload control system 50 is provided, comprising upload manager module 120, plain domain decoder 142 and encrypted domain decoder 144 remote from the source terminals 12a,b and the target terminal 16 and coupled to source terminals 12a,b and target terminal 16 via communication network. Upload control system 50 may be an upload server comprising upload manager module 120, plain domain decoder 142 and encrypted domain decoder 144, or upload manager module 120, plain domain decoder 142 and encrypted domain decoder 144 may be independent servers.

In another example, plain domain decoder 142 and encrypted domain decoder 144 are located in different decoder servers, at distinct network addresses. In this case, upload manager module 120 may select from these different decoder servers dependent on the need for encrypted domain decoding and send commands that identify the selected server to the selected source terminals to make the source terminals transmit data parts to the selected decoding server. Similarly, use may be made of servers to perform encoding and/or encryption by transmitting the data object or data parts back and forth via the communication network to such servers in advance of a retrieval command.

Although an embodiment has been described wherein trusted source terminals 12b store unencrypted versions, in an alternative embodiment source terminals 12b may store only encrypted versions. In this embodiment the option of using plain domain decoding may be omitted.

Although an embodiment has been described wherein complete data parts are stored at untrusted source terminals from trusted source terminals, in an alternative embodiment the data parts may be distributed using an additional layer of redundant coding applied to the encrypted data part to produce N' sub data parts. In this embodiment, the decoder server may comprise an additional decoder to use decoding to reconstruct the encrypted part from a subset of the sub-data parts before applying encrypted domain decoding.

Although an embodiment has been described wherein public-private key pair encoding is used, alternatively symmetric key encoding may be used.

In an embodiment the same data may be split into bit groups in a plurality of different ways, so that a plurality of different codewords may be formed for the same data. In this embodiment the data parts Y(1) to Y(N) from a first code word may be sent to trusted source terminals 12a,b, and encrypted data parts Y'(1) to Y'(N) of a second code words may be sent to untrusted terminals 12b. In this way trusted source terminals 12a,b can download from the trusted source terminals, and the first source terminal 12a can download from both trusted and untrusted source terminals.

A plurality of data parts must be transmitted to and from the encrypted domain decoder. In contrast to individual source terminals need to transmit only one, or at least less than the number of the data parts that must be available at the encrypted domain decoder. Embodiments have been shown wherein at least the encrypted domain decoder is located remote from the source terminals, in the sense that the terminal side communication paths from the source terminals to the communication network are upstream from the encrypted domain decoder in the data transport path from the source terminals to the target terminal via the encrypted domain decoder. These terminal side communication paths are the communication lines from homes or residences to the communication network, or wireless connections to the network with limited bandwidth. In contrast the encrypted domain decoder may have higher bandwidth connections to the communication network. This means that less bandwidth is needed at the terminal side communication paths than at the encrypted domain decoder.

In the illustrated embodiments, the encrypted domain decoder is also remote from the target terminal. This may not reduce the bandwidth demand in the download communication path between the encrypted domain decoder and the target terminal. But the download communication path may have higher bandwidth than the upload paths. However, an advantage of using an encrypted domain decoder remote from the target terminal, rather than using the target terminal to decrypt and then reconstruct the data object, is that the computational demands on the target terminal are reduced.

It may be noted that encryption could be applied data parts X(i) of the data object prior to encoding using the redundant code, using homomorphic equivalents of the arithmetic operations of the encoding scheme. In a system for encoding this may be used to make it possible to perform the encoding at a server remote from the source terminal that provides the data object without revealing its content, while allowing for decoding after decryption. Such a system may comprise a source terminal, a plurality of auxiliary terminals, and an encrypted domain encoder coupled via a communication network, the encrypted domain encoder being configured to receive an encrypted data object, to apply encoding using homomorphic equivalents of the arithmetic operations of the encoding scheme and to transmit the resulting data parts to the auxiliary terminals. The auxiliary terminals may store and/or forward these data parts for further use.

A data object is encoded in a redundant code. The redundant code defines a decoding scheme for reconstructing the data object from a sub-set of the encoded data parts. At least the sub-set of the encoded data parts is encrypted using a homomorphic encryption scheme, which allows equivalents of the arithmetic operations of a reconstruction process to be performed on encrypted encoded data parts. The data parts are stored distributed over a plurality of source terminals of a communication network, for use by a target terminal of the communication network. Upon a retrieval command from the target terminal, an upload management module determines which source terminals are available and the upload management module determines causes a selected set of terminals to transmit the encrypted encoded data parts each via its own connection to the network to a decoder server. The decoder server performs homomorphic equivalent operations of arithmetic operations of the reconstruction process and downloads the results to the target terminal. In this way the target terminal does not need to perform the entire reconstruction, without requiring decryption outside the target terminal.

The invention claimed is:

1. A method of transporting a data object to a target terminal via a network, using encoded data parts from a plurality of source terminals, wherein encoded data parts derived by encoding the data object in a redundant code are used, the redundant code defining a decoding scheme for reconstructing the data object from a sub-set of the encoded data parts, and wherein at least the sub-set of the encoded data parts has been encrypted using a homomorphic encryption scheme after the encoding and stored distributed over the plurality of source terminals, the method comprising collecting the sub-set of the encrypted encoded data parts at a decoder server in the network from the plurality of source terminals, applying homomorphic equivalents of arithmetic operations of the decoding scheme, thereby reconstructing an encrypted version of the data object in the decoder server, the homomorphic equivalents of the arithmetic operations being applied to the encrypted encoded data parts at the decoder server, transmitting results of applying the homomorphic equivalents of the arithmetic operations to the target terminal for decryption of the data parts from the results at the target terminal.

2. A method according to claim 1, wherein the decoding scheme comprises reconstructing at least part of a code word that comprises a plurality of bit groups, by applying arithmetic operations wherein the bit groups are used as numbers, the data parts in the sub-set being data parts resulting from individual application of the homomorphic encryption scheme each time to a respective one of the bit groups.

3. A method according to claim 1, comprising transmitting information to the target terminal indicating the value of a common factor introduced by said applying homomorphic equivalents, for application by the target terminal to a plurality of the results during or after decryption.

4. A method according to claim 1, wherein first ones of the source terminals have stored encrypted encoded data parts, and second ones of the source terminals have stored plain versions of further ones of the encoded data parts to which the homomorphic encryption has not been applied, the method comprising
- determining whether a sufficient number of said plain versions of the further ones of the encoded data parts is available for application of the decoding scheme using said further ones of the encoded data parts only,
- when it has been determined that said sufficient number is available, applying the arithmetic operations of the decoding scheme to the plain versions of the further ones of the encoded data parts,
- when it has been determined that said sufficient number is not available, using the decoder server to apply homomorphic equivalents of arithmetic operations of the decoding scheme to the sub-set with encrypted encoded data parts.

5. A method according to claim 4, comprising, when it has been determined that said sufficient number is not available, using encrypted versions of at least part of said further ones of the encoded data parts from the second ones of the source terminals in combination with the encrypted encoded data parts from the first ones of the source terminals to form said sub-set.

6. A method according to claim 5, comprising encrypting said at least part of said further ones of the encoded data parts from the second ones of the source terminals for use in said sub-set, in response to the determination that said sufficient number is not available.

7. A method according to claim 4, comprising encrypting the plain version of a first of the further ones of encoded data parts at the second ones of the source terminals and forwarding the encrypted first of the further ones of the encoded data parts to at least one of the first ones of the source terminals to form one of the encrypted encoded data parts at the at least one of the first ones of the source terminals prior to said determining.

8. A method according to claim 4, comprising
- encrypting the plain version of a first of the further ones of encoded data parts at the second ones of the source terminals;
- encoding the encrypted first of the further ones of encoded data parts into sub-parts using said redundant code or a further redundant code;
- transmitting the sub parts to respective source terminals;
- reconstructing the encrypted first of the further ones of encoded data parts from a sub-set of the sub-parts and using the reconstructed encrypted first of the further ones of encoded data parts as one of the sub-set of the encoded data parts from the source terminals at the decoder server in the network.

9. An upload manager module for controlling transport of a data object to a target terminal via a network, using encoded data parts from a plurality of source terminals, wherein encoded data parts derived by encoding the data object in a redundant code are used, the redundant code defining a decoding scheme for reconstructing the data object from a sub-set of the encoded data parts, and wherein at least the sub-set of the encoded data parts has been encrypted using a homomorphic encryption scheme and stored distributed over the plurality of source terminals, the upload manager module being configured to
- send commands to the plurality of source terminals to transmit respective ones of the encrypted encoded data parts in the sub-set to a decoder server in the network,
- cause the decoder server to apply homomorphic equivalents of arithmetic operations of the decoding scheme, thereby reconstructing an encrypted version of the data object in the decoder server, the upload manager module being configured to cause the decoder server to apply the homomorphic equivalents of the arithmetic operations to the encrypted encoded data parts and to transmit results of applying the homomorphic equivalents of the arithmetic operations to the target terminal.

10. An upload manager module according to claim 9, configured to select a value of a common factor introduced by said applying homomorphic equivalents, and to send information indicating the value of the common factor to the target terminal for application of the common factor to a plurality of the results during or after decryption at said target terminal.

11. An upload manager module according to claim 10, for use in a system wherein first ones of the source terminals have stored encrypted encoded data parts, and second ones of the source terminals have stored plain versions of further ones of encoded data parts to which the homomorphic encryption has not been applied, the upload manager module being configured to
- determine whether a sufficient number of said plain versions of further ones of the encoded data parts is available for application of the decoding scheme using said further ones of the encoded data parts only,
- in response to determining that said sufficient number is not available, performing said transmission of the commands to the first ones of the source terminals and performing said causing the decoder server to apply the homomorphic equivalents of the arithmetic operations.

12. An upload manager module according to claim 11, the upload manager module being configured respond a determination that said sufficient number is available by
- transmitting commands to the second ones of the source terminals, to make the second ones of the source terminals transmit respective ones of the plain versions of further ones of encoded data parts to the decoder server or a further decoder server,
- causing the decoder server or the further decoder server to apply the arithmetic operations of the decoding scheme to the plain versions and to transmit results of applying the arithmetic operations to the target terminal.

13. A decoding system comprising said upload manager module according to claim 9, and an encrypted domain decoder configured to apply the homomorphic equivalents of arithmetic operations of the decoding scheme to the encrypted encoded data parts when caused by the upload manager module to apply homomorphic equivalents of arithmetic operations.

14. A decoder server for reconstructing data parts of a data object, using encoded data parts, wherein encoded data parts derived by encoding the data object in a redundant code are used, the redundant code defining a decoding scheme for reconstructing the data object from a sub-set of the encoded data parts, the decoder server comprising a network input for receiving encrypted encoded data parts from a plurality of source terminals via a communication network;

a plain domain decoder configured to apply arithmetic operations of the decoding scheme to said encoded data parts;

an encrypted domain decoder configured to apply homomorphic equivalent operations of the arithmetic operations to said encoded data parts;

a selector configured to select between transmitting a decoding result obtained from the plain domain decoder or a decoding result obtained from the encrypted domain decoder to a target terminal.

15. A non-transitory computer readable medium, comprising instructions for a programmable processing system for use in a decoder server in a network wherein a data object is transported to a target terminal, using encoded data parts from a plurality of source terminals, wherein encoded data parts derived by encoding the data object in a redundant code are used, the redundant code defining a decoding scheme for reconstructing the data object from a sub-set of the encoded data parts, and wherein at least the sub-set of the encoded data parts has been encrypted using a homomorphic encryption scheme, wherein the instructions are configured to make the processing system collect the sub-set of the encrypted encoded data parts from the source terminals at the decoder server in the network, apply homomorphic equivalents of arithmetic operations of the decoding scheme to the encrypted encoded data parts at the decoder server, transmit results of applying the homomorphic equivalents of the arithmetic operations to the target terminal for decryption of the data parts from the results at the target terminal.

16. A non-transitory computer readable medium, according to claim 15, wherein the instructions are configured to make the processing system transmit information indicating the value of a common factor to be applied to the results during or after decryption to said target terminal.

17. A non-transitory computer readable medium, according to claim 15, for use in a network wherein first ones of the source terminals have stored encrypted encoded data parts, and second ones of the source terminals have stored plain versions of further ones of the encoded data parts to which the homomorphic encryption has not been applied, the instructions being configured to make the processing system determine whether a sufficient number of said plain versions of the further ones of the encoded data parts is available for application of the decoding scheme using said further ones of the encoded data parts only, when it is determined that said sufficient number is available, apply the arithmetic operations of the decoding scheme to the plain versions of the further ones of the encoded data parts, when it is determined that said sufficient number is not available, use the decoder server to apply homomorphic equivalents of arithmetic operations of the decoding scheme to the sub-set with encrypted encoded data parts.

18. A non-transitory computer readable medium, according to claim 15, wherein the instructions are configured to make the processing system, when it is determined that said sufficient number is not available, use encrypted versions of at least part of said further ones of the encoded data parts from the second ones of the source terminals in combination with the encrypted encoded data parts from the first ones of the source terminals to form said sub-set.

19. A method of transporting a data object to a target terminal via a network, comprising encoding the data object in a redundant code to produce a plurality of encoded data parts, the redundant code defining a decoding scheme for reconstructing the data object from a sub-set of the encoded data parts, encrypting at least the sub-set of the encoded data parts using a homomorphic encryption scheme distinct from said encoding in the redundant code, to produce encrypted encoded data parts, storing the encrypted encoded data parts distributed over a plurality of source terminals, collecting the encrypted encoded data parts from the source terminals at a decoder server in the network, applying homomorphic equivalents of arithmetic operations of the decoding scheme to the encrypted encoded data parts at the decoder server, transmitting results of applying the homomorphic equivalents of the arithmetic operations to the target terminal for decryption of the data parts from the results at the target terminal.

* * * * *